Figure 1:
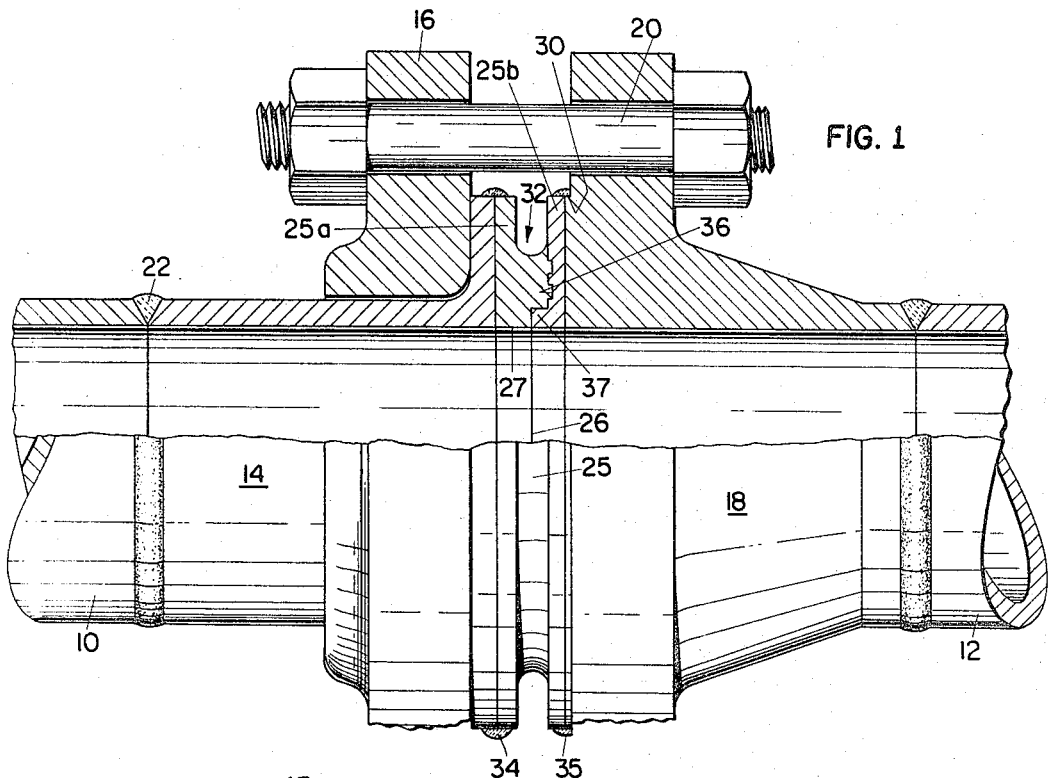

March 28, 1967 H. F. BUSCHOW 3,311,392
BIMETALLIC JOINT FOR CRYOGENIC SERVICE
Filed March 16, 1966 2 Sheets-Sheet 1

INVENTOR.
HERMAN F. BUSCHOW
BY *Nathaniel Ely*
ATTORNEY

March 28, 1967 H. F. BUSCHOW 3,311,392
BIMETALLIC JOINT FOR CRYOGENIC SERVICE
Filed March 16, 1966 2 Sheets-Sheet 2
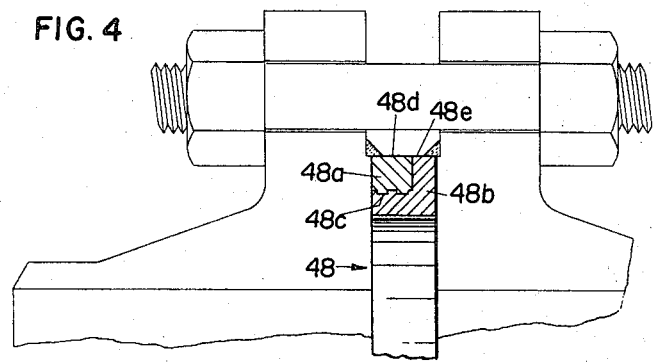
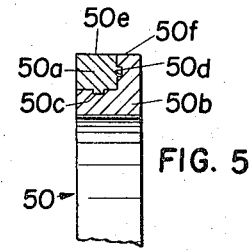
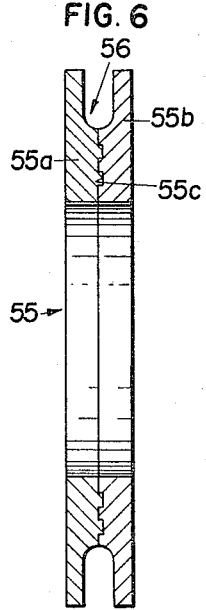
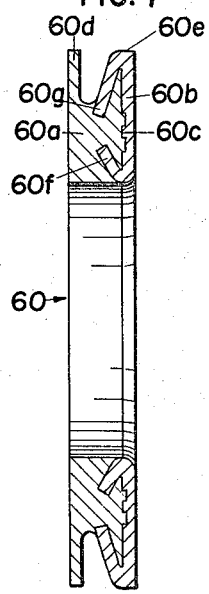
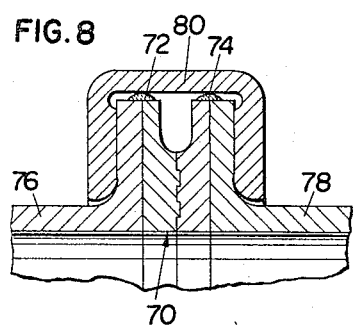
INVENTOR.
HERMAN F. BUSCHOW
BY Nathaniel Ely
ATTORNEY United States Patent Office 3,311,392
Patented Mar. 28, 1967

3,311,392
BIMETALLIC JOINT FOR CRYOGENIC SERVICE
Herman F. Buschow, Hillsdale, N.J., assignor to Hydrocarbon Research, Inc., New York, N.Y., a corporation of New Jersey
Filed Mar. 16, 1966, Ser. No. 543,462
4 Claims. (Cl. 285—173)

This application is a continuation-in-part of my copending application Ser. No. 334,719, filed Dec. 31, 1963, and now abandoned.

My invention relates to improvements in joints and gaskets and for cryogenic service wherein adjacent elements of flanges, pipe couplings or valve parts are of dissimilar materials.

As is customarily practiced in the cryogenic art wherein temperatures are often in the order of —250° F. and lower, piping and fittings are fabricated of various steels, copper, aluminum, brass, magnesium, etc. For some purposes, one metal has qualities that make its use desirable or even imperative, but at the same time a pipe made of another metal is desirable in another place. Frequently such dissimilar metal elements must be secured together and absolutely sealed. In a similar manner, where pipes, valves, etc. are provided with flanged parts, they are frequently connected to other elements of dissimilar metals.

The problem to which this invention is particularly directed arises when two dissimilar metal parts must be joined to form a unitary, gas tight conduit. Ordinarily, welding and brazing are desirable methods of joining pipes but there are many metals, such as aluminum and stainless steel which cannot satisfactorily be welded to each other. The use of transition joints such as described in my Patents 2,787,481 and 3,208,776, where appropriate, are then used with advantage.

In many cases, however, the joint is between flanged parts which may have been sealed with non-metallic gaskets. The normal working of such joints due to expansion or contraction due to heat then tends to make the flanges leak with a very substantial loss of valuable products. My tubular transition joint is not applicable to this service. However, as such flanged parts cannot normally be welded together, it has been found that leakage has become prohibitively expensive in the cryogenic art, and other chemical services.

My present invention has for its principal purpose the provision of a unique gasket which makes it possible to shop, or field weld, or braze pipe flanges of dissimilar metals into a continuous, leak poof unit.

More specifically, I provide a gasket having two body members of dissimilar metals that can be molecularly bonded together in a production line operation and then used in the field between flanged fittings, valves, etc. which are also of dissimilar metals. Field welding at the adjacent surfaces then makes a permanent pressure tight connection which is unaffected by changes in temperature. Furthermore, the flexible lips of the gasket at the welding edges will allow for distortion caused by pressure or bolting and will maintain the joint gas tight if the bolts become loose (as by vibration or temperature cycles) regardless of the necessary compression and bending stresses to which piping is frequently subjected in its great variation of temperature. They also make it possible to expeditiously accomplish field maintenance, as for example, replacing a valve. Where such a valve is in place in a line of different metals, the valve may be readily cut out and replaced with simple welding of the gasket to the adjacent flanged parts.

Further objects and advantages of my invention will be apparent from the following description of a preferred form of embodiments when taken with the drawings attached, in which:

FIG. 1 is a side elevation with parts in section showing a preferred type of coupling embodying my invention.

FIGS. 2, 3, 4, 5, 6, 7, and 8 are detailed cross sectional views of other modified forms of gaskets.

As illustrated in FIG. 1, a Van Stone type of coupling is shown for coupling a first pipe or conduit 10 to a second pipe or conduit 12. In such a construction, there is usually a fixed flange 14 carrying a loose collar 16 on one pipe and either a similar arrangement on the adjacent pipe, or a fixed flange 18. The flange 18 and collar 16 are suitably clamped or bolted together as by bolts or studs 20.

In a low temperature system such as characteristic of air liquefaction systems for the production of oxygen and nitrogen, and for similar duty in connection with liquefied hydrogen and other gases, it is recognized that it is often necessary to connect a pipe 10 to a pipe 12 wherein the pipe 10 may be of stainless steel, and the pipe 12 of aluminum. Frequently, it is necessary to connect pipes to flange elements such as valves or other couplings, and in such case, the flanged elements 14 and 18 will be of a metal compatible with the pipe portions 10 and 12 so that the welding, as indicated at 22, may be accomplished in the field.

In the field, the make-up of the various pipe fittings is then accomplished, in accordance with my invention, by the use of a multi-body gasket generally indicated at 25. As will be described hereinafter, the gasket 25 may be of different shapes or construction but it includes at least two parts designated as the first body portion 25a and the second body portion 25b. These body portions are of dissimilar metals and are molecularly bonded together on the parting face indicated by line 26. A central bore 27 permits the desired flow between pipe members.

As more particularly shown in FIG. 1, the lateral extremities of the body portions 25a and 25b of the gasket 25 have external planar surfaces which extend outward on the one hand to a diameter substantially equal to that of the flange portion 14a of the Van Stone joint, and on the other hand substantially equal to that of the undercut portion 30 on the other flange 18. With the body portion 25a of the gasket 25 of the same or compatible metal (weldable) with the metal of flange portion 14a, these parts may be welded from the exterior of the pipe along the bead 34. Similarly, the metal of body portion 25b is the same or compatible metal (weldable) to the metal of flange 18 so that these parts can be externally welded at 35.

Preferably the central portion of the gasket 25 is relieved or undercut as indicated at 32 which tends to form in cross section, a U-shaped portion which has substantial flexibility when the joint is welded up. The studs or bolts 20, although used for safety, are not essential for taking normal pipe-line stresses due to thermal or pressure changes.

For cryogenic service, the gasket 25 is usually made as a production item available for installation in the field with the adjacent body members of metals corresponding to the parts of the piping system to which they are secured. To accomplish this, the body portions 25a and 25b of the gasket are integrated as by casting, or other suitable means, the softer metal such as aluminum onto a suitably machined clean hard metal such as stainless steel. Preferably, the parting line on the stainless steel piece will have a series of annular lands and grooves as shown at 36 so that there is no tendency of the softer aluminum to work free from the stainless steel. This also tends to resist shear between the body portions. An internal overlap portion 37 made by an L-shaped body portion 25b may also be used to assure freedom from movement under internal pressure with respect to the body portion 25a.

A preferred method of forming a molecular bond and thus a permanent gas seal between the faces of the gasket body portions, particularly where the gasket is to be used in cryogenic service, is to carry out the following steps:

(1) Clean the high density (stainless steel) body portion of all oil and surface dirt.

(2) Preheat the high density body portion to about 500–600° F.

(3) Flux the high density body portion to remove oxides and to preheat it nearly to the aluminum melting point.

(4) Insert the high density body portion in a mold.

(5) Pour molten light aluminum or aluminum alloy into the mold over the high density portion and in a manner to displace the flux.

(6) Cool assembly promptly.

(7) Machine to size (and shape).

As described in my Patent 3,208,776, I have found that stainless steel parts, particularly after storage, frequently have oil films or dirt which must be removed to permit the aluminum bonding which forms the gas seal. Such stainless steel is thus cleaned with the usual degreasing techniques and I may also make a shallow or bright cut without necessarily removing the tool marks.

In the second step, I find it desirable to preheat the stainless steel body portion to about 500–600° F. as by an induction heating coil or other means not shown. Preheating must be below 800° F. in air to prevent a reoxidation of the metal surface.

As a third step in the process, the body portion 25b (the stainless steel element) is injected into a suitable body of flux, which for stainless steel, is primarily a fluoride composition as it effectively removes the oxides, usually chromic oxide. A flux temperature of about 1000° F. has proved effective and after the body portion has reached substantially the same temperature, it is moved up and down in the flux to assist in forming a desired coating. It has been found that when the body portion is initially placed in the flux some solidification of the flux takes place forming a skin in the nature of a crud, and that when this crud redissolves in the flux, the body portion has reached the desired preheat temperature.

The fourth step in my process is to place the flux carrying stainless steel body portion in a mold which is conveniently a shallow mold and maintained hot by suitable external heating.

The molten light metal is next poured into the mold, with the melt usually being at a temperature around 1400–1450° F. which is about 200° F. above the melting point. The flux is now found to float to the surface and the poured aluminum effectively covers the exposed face of the stainless steel body portion. The depth of the aluminum coating is usually several times the thickness of the stainless steel so that the parts have equal strength characteristics.

The sixth step in my process, particularly for aluminum (and aluminum alloys) is to promptly cool the assembly. This reduces diffusion of aluminum into the stainless steel material and while an alloy bond results, its thickness is minimized as much as possible.

The gasket is then suitably machined as desired.

The gasket of this type is not only unusually gas tight and corrosion free with a very low gas permeability at very low temperatures, but it will withstand considerable shock treatment as evidenced by tests of repeated heating and sudden cooling. It also withstands shear and has a mechanical strength as great or greater than the piping to which it is attached.

Figure 2:
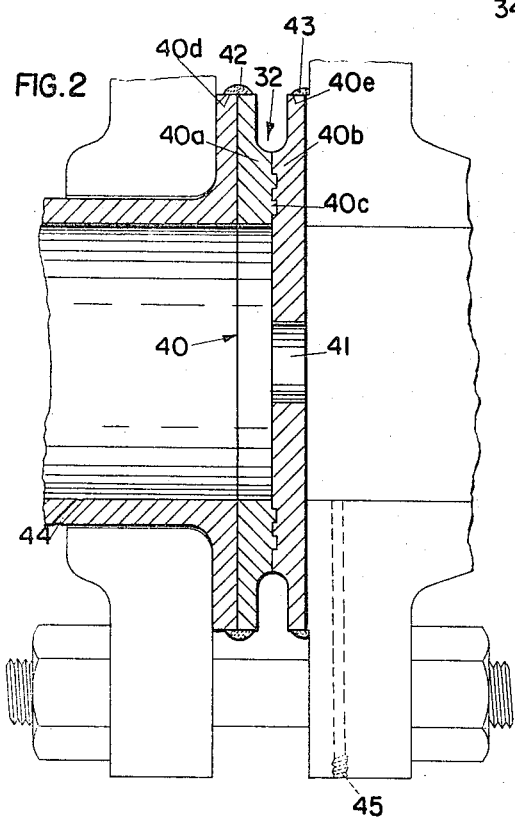

A modified form of construction of simplified form is shown in greater detail in FIG. 2 in which the gasket generally indicated at 40 includes the separate body portions 40a and 40b which are of dissimilar metal and formed integral and bonded one against the other with the channels 40c serving to resist transverse shear. The terminal portions 40d and 40e are undercut as at 32 to form the flexible securing means during welding and operation to adjacent pipe elements or fittings. Conveniently, this type of gasket may be used as an orifice with the machined and calibrated opening 41. As in the earlier form, the extremities 40d and 40e are welded at 42 and 43 to the adjacent flange portions. In an orifice type arrangement, the flanged portions will have the usual orifice meter connections 44 and 45.

Figure 3:
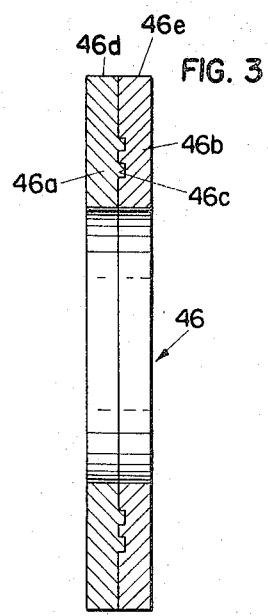

A further modified form of construction is shown in FIG. 3 in which the gasket 46 is similarly provided with separate body portions 46a and 46b, it being preferred construction in this case to make the extension portions 46d and 46e coextensive and not undercut. The parting line grooves 46c may be used.

A further modified form is shown in FIG. 4 in which the gasket 48 is provided with body portions 48a and 48b with transverse shear channels 48c. The extremities 48d and 48e are adapted to welding to adjacent pipe fittings. The L-shaped arrangement of body member 48b assures a very strong connection to body member 48a.

FIG. 5 is a form of embodiment similar to FIG. 4 in that it is of the L shape but with interlocking grooves 50c and 50d on the respective faces of the body portions 50a and 50b.

FIG. 6 shows a still further modified form of construction generally similar to the orifice type gasket of FIG. 2. The part of this gasket 55 are the body portions 55a and 55b with shear channels 55c. The extremities are undercut as shown at 56 for flexibility.

FIG. 7 shows a so-called dovetail type gasket 60 wherein the body portion 60a is embraced in the cross section of a C-shaped hard metal body portion 60b into which the softer element 60a is cast. Shear channels and lands 60c are placed on the parting line. There is thus a very substantial resistance to axial forces. It is provided with the welding extremities 60d and 60e. The internal clamp portions 60f and 60g will resist any transverse forces to which the gasket would be subjected.

FIG. 8 shows a form of gasket 70 which is welded at 72 and 74 to flanged members 76 and 78 with a C-clamp 80 holding the flanges together.

While reference has been made to the common materials of aluminum and stainless steel, it is, of course, to be understood that the lighter metal may be of any other non-ferrous material such as copper and the stainless steel may be austentic steel or other common ferrous metal.

While I have shown several preferred forms of embodiment of my invention, I am aware that other modifications may be made thereto and I, therefore, desire a broad interpretation of my invention within the scope and spirit of the description herein and of the claims appended hereinafter.

I claim:

1. In a piping system wherein the piping elements are of dissimilar metals and are connected by a pipe joint assembly, said joint assembly comprising a first pipe of aluminum and a second pipe of stainless steel, said pipes being in longitudinal axial alignment, each pipe having a radially outwardly extending flange, said flanges having generally planar confronting faces, a gasket positioned between and connected to said flanges in gas sealing relation, said gasket comprising an integrated pair of body members, said integrated pair having a transverse bore for the passage of fluids from one pipe to the other, said body members being composed respectively of aluminum and of stainless steel, said aluminum body member being molded against the stainless steel member and having a chemical bond uniting said body members at their interface, said body members having interengaging portions along at least a portion of their interface, said bond being occasioned by the migration of metal between the stainless steel and the aluminum forming an iron-aluminum alloy, said alloy being microscopically thin and penetrating into the aluminum by progressively decreasing amounts providing a cohesion between said body members having a relatively low brittleness factor and serving as a gas seal, said body members forming a relatively axially thick gasket body, said body members each having a flange-like portion extending radially outwardly, said flange-like portions being relatively thin with respect to the gasket body and forming an annular space therebetween, each flange portion being welded to the adjacent pipe flange of like metal, said body members being ing adapted to transfer stresses of the piping elements through said iron-aluminum alloy portion; said radially outwardly extending flange-like portions being exposed externally of the piping whereby welding and rewelding can be accomplished without destruction of the piping system.

2. A joint assembly for pipes of dissimilar material as claimed in claim 1 wherein the body members are provided with overlapping portions to resist shear.

3. A joint assembly for pipes of dissimilar material as claimed in claim 1 wherein the body members are provided with overlapping portions to resist tension.

4. A joint assembly for pipes of dissimilar material as claimed in claim 1 wherein the body members are provided with overlapping portions to resist tension and shear.

References Cited by the Examiner
UNITED STATES PATENTS

| | | | |
|---|---|---|---|
| 2,006,365 | 7/1935 | Morton | 277—154 |
| 2,739,828 | 3/1956 | Schindler et al. | 285—187 |
| 3,208,776 | 9/1965 | Buschow | 285—383 |

FOREIGN PATENTS

| | | |
|---|---|---|
| 386,014 | 1/1933 | Great Britain. |
| 718,267 | 11/1954 | Great Britain. |
| 859,677 | 1/1961 | Great Britain. |

CARL W. TOMLIN, *Primary Examiner.*

THOMAS F. CALLAGHAN, *Examiner.*